US008493955B2

(12) United States Patent
Nandagopalan et al.

(10) Patent No.: US 8,493,955 B2
(45) Date of Patent: Jul. 23, 2013

(54) INTERFERENCE MITIGATION MECHANISM TO ENABLE SPATIAL REUSE IN UWB NETWORKS

(75) Inventors: Saishankar Nandagopalan, San Diego, CA (US); Dinesh Dharmaraju, San Diego, CA (US); Ranganathan Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1103 days.

(21) Appl. No.: 11/620,622

(22) Filed: Jan. 5, 2007

(65) Prior Publication Data

US 2008/0167063 A1 Jul. 10, 2008

(51) Int. Cl.
*H04B 7/212* (2006.01)

(52) U.S. Cl.
USPC ........... 370/348; 370/230; 370/322; 370/328; 370/329; 455/450; 455/452.2

(58) Field of Classification Search
USPC ................. 370/322, 328, 329, 330, 332, 333, 370/348; 445/450, 456.2, 452.1
See application file for complete search history.

(56) References Cited

U.S. PATENT DOCUMENTS

| | | | | |
|---|---|---|---|---|
| 6,782,271 B2 * | 8/2004 | Huh et al. | ....................... | 455/522 |
| 6,975,604 B1 * | 12/2005 | Ishida et al. | .................. | 370/331 |
| 6,975,609 B1 * | 12/2005 | Khaleghi et al. | ............. | 370/335 |
| 6,990,080 B2 | 1/2006 | Bahl et al. | | |
| 7,031,741 B2 * | 4/2006 | Lee et al. | ....................... | 455/522 |
| 7,050,405 B2 * | 5/2006 | Attar et al. | .................... | 370/282 |
| 7,116,982 B2 | 10/2006 | Balachandran et al. | | |
| 7,269,423 B2 * | 9/2007 | Lee et al. | ................... | 455/452.1 |
| 7,272,310 B2 | 9/2007 | Maciocco et al. | | |
| 7,499,486 B2 * | 3/2009 | Boer et al. | ..................... | 375/219 |
| 7,613,138 B2 | 11/2009 | Bahl et al. | | |
| 7,623,897 B1 | 11/2009 | Elliott | | |
| 7,693,122 B2 | 4/2010 | Carlson et al. | | |
| 8,031,603 B1 | 10/2011 | Polk et al. | | |

(Continued)

FOREIGN PATENT DOCUMENTS

| | | |
|---|---|---|
| CN | 1386338 A | 12/2002 |
| CN | 1650283 A | 8/2005 |

(Continued)

OTHER PUBLICATIONS

Sampath A et al: "Power control and resource management for a multimedia CDMA wireless system" Personal Indoor and Mobile Radio Communications, 1995. PIMRC '95. Wireless: Merging Onto the Information Superhighway., Sixth IEEE International Symposium on Toronto, Ont., Canada, US, vol. 1, Sep. 27, 1995, pp. 21-25, XP010150786.

(Continued)

*Primary Examiner* — Jinsong Hu
*Assistant Examiner* — Magdi Elhag
(74) *Attorney, Agent, or Firm* — QUALCOMM Patent Group; James Hunt Yancey, Jr.

(57) ABSTRACT

Mechanism to mitigate signal interference in ultra wide band (UWB) networks based on spatial reuse of the signal spectrum. Efficient media access control (MAC) in wireless networks is challenging because wireless devices may be affected by signal interference during spatial multiplexing. Wireless ad-hop (multi-hop) networks exploit the limited system bandwidth available via spatial reuse to enhance aggregate throughput. Spatial reuse allows concurrent data exchanges, resulting in higher throughputs.

17 Claims, 3 Drawing Sheets

U.S. PATENT DOCUMENTS

| | | | |
|---|---|---|---|
| 8,320,244 B2 | 11/2012 | Muqattash et al. | |
| 2003/0009582 A1 | 1/2003 | Qiao et al. | |
| 2003/0078050 A1* | 4/2003 | Carlborg et al. | 455/452 |
| 2003/0128687 A1 | 7/2003 | Worfolk et al. | |
| 2004/0083287 A1 | 4/2004 | Gao et al. | |
| 2004/0209579 A1* | 10/2004 | Vaidyanathan | 455/101 |
| 2005/0058104 A1 | 3/2005 | Yomo et al. | |
| 2005/0117541 A1 | 6/2005 | Negus | |
| 2005/0169232 A1 | 8/2005 | Sakoda et al. | |
| 2006/0215611 A1* | 9/2006 | Nakagawa et al. | 370/332 |
| 2007/0041322 A1* | 2/2007 | Choi et al. | 370/235 |
| 2007/0093209 A1* | 4/2007 | Agrawal et al. | 455/63.1 |
| 2007/0253368 A1* | 11/2007 | Zhang et al. | 370/329 |
| 2008/0144493 A1* | 6/2008 | Yeh | 370/230 |
| 2008/0160921 A1* | 7/2008 | Li et al. | 455/67.13 |
| 2008/0175149 A1 | 7/2008 | Andrews et al. | |
| 2008/0285480 A1 | 11/2008 | Panwar et al. | |
| 2009/0011711 A1* | 1/2009 | Kawasaki et al. | 455/62 |
| 2010/0265891 A1 | 10/2010 | Belcea | |

FOREIGN PATENT DOCUMENTS

| | | |
|---|---|---|
| EP | 0749261 A2 | 12/1996 |
| EP | 1059773 A2 | 12/2000 |
| JP | 2003259442 A | 9/2003 |
| JP | 2006050519 A | 2/2006 |
| JP | 2006270150 A | 10/2006 |
| JP | 2006304355 A | 11/2006 |
| JP | 2007515819 T | 6/2007 |
| JP | 2008500753 T | 1/2008 |
| TW | I242955 | 11/2005 |
| TW | I248735 | 2/2006 |
| WO | 9604718 | 2/1996 |
| WO | WO0039967 | 7/2000 |
| WO | WO2005020517 | 3/2005 |
| WO | WO2005076544 | 8/2005 |
| WO | 2005125252 A1 | 12/2005 |
| WO | WO2006089568 A1 | 8/2006 |

OTHER PUBLICATIONS

International Search Report—PCT/US2007/089094, International Search Authority—European Patent Office—Jul. 3, 2008.

Written Opinion—PCT/US2007/089094, International Search Authority—European Patent Office—Jul. 3, 2008.

Cheng Yen, et al; "Signaling and Qos Guarantees in Mobile Ad Hod Networks," ICC 2002. 2002 IEEE International Conferance on Communications. Conference Proceedings, New York, Apr. 28-May 2, 2002, IEEE International Conference on Communications, New York, NY : IEEE, US, vol. 1 of 5, pp. 3284-3290, XP010590078.

Taiwan Search Report—TW097100469—TIPO—Nov. 1, 2011.

Carlson, E. et al.,"Distributed Maintenance of Resource Reservation Paths in Multihop 802.11 Networks", 2004 IEEE 60th Vehicular Technology Conference, 2004, VTC2004—Fall, pp. 2994-2998, Sep. 26-29, 2004.

* cited by examiner

INTERFERENCE MITIGATION MECHANISM TO ENABLE SPATIAL REUSE IN UWB NETWORKS

BACKGROUND

I. Field

This invention relates to wireless communication. More particularly, the invention relates to resource management, useful in an ad-hoc wireless communication system in which adjustments in signal power can provide an increase in spatial reuse of signal spectrum.

II. Background

In shared spectrum wireless communication systems, the capacity is in part determined by the signal power used to communicate with each user. This is affected by the total power transmitted by all transmitters within a particular geographical area, the relative power of each transmitter and the maximum power allocated to each device. In addition, the capacity is controlled by the data rate of each transmission.

Recent research has shown that multi-hop, radio frequency (RF) wireless networks are generally not scalable, and tire size and number of users is limited. When deploying a wireless local area network (WLAN), the aggregate signal throughput (the speed of sending information over time) of all users is what can be used to determine the number of users that an access point can support to provide adequate RF coverage.

For 802.11b networks operating at 11 Mbps, the total throughput capacity of an access point is about 6 Mbps. As a result, the access point in this example would support approximately 60 active users (6 Mbps/100 Kbps). If all users were viewing high quality streaming video, then the access point would only effectively handle about three users (6 Mbps/2 Mbps). In actual practice, it is very difficult to accurately determine the throughput requirements of individual users, and it is hard to predict utilization levels and traffic patterns. To obtain a clearer picture of throughput before deploying the network or making changes, it is possible to model 802.11 traffic in a network and view throughput levels under various conditions.

The data rate also controls the ability of a wireless communication to process signals at a given power in a given signal environment. Lower data rates permit decreased signal power for adequate reception and consequently permit the transmission to be made at reduced power while maintaining at least a predetermined minimum quality of service (QoS). By reducing the power while maintaining at least a predetermined minimum QoS, a local network is able to admit more users.

SUMMARY

Various aspects and embodiments of the invention are described in further detail below.

Resource management for an ad-hoc wireless communication system provides for an increase in spatial reuse of signal spectrum. A request to reserve message is received by a station from a first wireless communication device and a determination is made of a signal quality value based on the received request to reserve message. The station responds with a reservation-confirm message which includes an assigned data rate. The station determines a threshold margin of the signal value at the data rate is and determines a reduction in power value for adjusting the power of the first wireless communication device (WCD) based on a received power in accordance with the signal quality value and the threshold margin. These determinations are used as adjustments, which provide the increase in spatial reuse of signal spectrum.

In one aspect, the station receives a communication request from a further WCD and determines if an acceptance of the communication request will result in the signal quality value of the first wireless communication device falling below the established threshold. If acceptance would result in the signal quality failing below the threshold, the communication request is rejected. If the signal quality would remain within the threshold, the communication request is accepted.

A WCD is configured to provide resource management for increased spatial reuse in an ad-hoc wireless communication system, and includes a signal quality determining circuit for determining a signal quality value based on the received, transmission allocation request message. The WCD provides a transmission allocation response which includes a data rate, and the WCD determines a threshold margin of the signal value at the data rate. The WCD includes an output circuit for transmitting a reduction in power value for adjusting the power of an external WCD based on a received power in accordance with the signal quality value and the threshold margin. The adjustment provides an increase in spatial reuse of signal spectrum.

In a further aspect, a chipset, including at least one semiconductor integrated circuit chip, is provided for use in a wireless communication device. The chipset includes a circuit module capable; of receiving communication signals from a plurality of external wireless communication devices (WCDs), a reservation request receiving circuit module, a signal quality determination circuit module, a transmission reservation response circuit module, a threshold determination circuit module, and circuit modules to transmit a reduction in power values. The reservation request receiving circuit module receives a request to reserve message from external wireless communication devices. The signal quality determination circuit module determines a signal quality value based on the received request to reserve message. The transmission reservation response circuit module provides a transmission reservation confirm message which includes an assigned data rate. The threshold determination circuit module is used to determine a threshold margin of the signal value at the data rate, and a transmission adjustment circuit module transmits a reduction in power value for adjusting the power of the first external wireless communication device based on a received power in accordance with the signal quality value and the threshold margin. The transmitting of the reduction in power value results in adjustments to provides an increase in spatial reuse of signal spectrum.

BRIEF DESCRIPTION OF THE DRAWINGS

The features and nature of the present invention will become more apparent from the detailed description set forth below when taken in conjunction with, the drawings in which like reference characters identify correspondingly throughout and wherein.

DETAILED DESCRIPTION

Overview

A communication system, and in particular, a mechanism for mitigating interference to enable spatial reuse in UWB networks in the system, is described in detail herein. In the following description, numerous specific details are provided to give a thorough understanding of the invention. One skilled in the relevant art, however, will readily recognize that the invention can be practiced without these specific details, or with alternative elements or steps. In other instances, well-known structures and methods are not shown in detail to avoid obscuring the invention.

Figure 1:
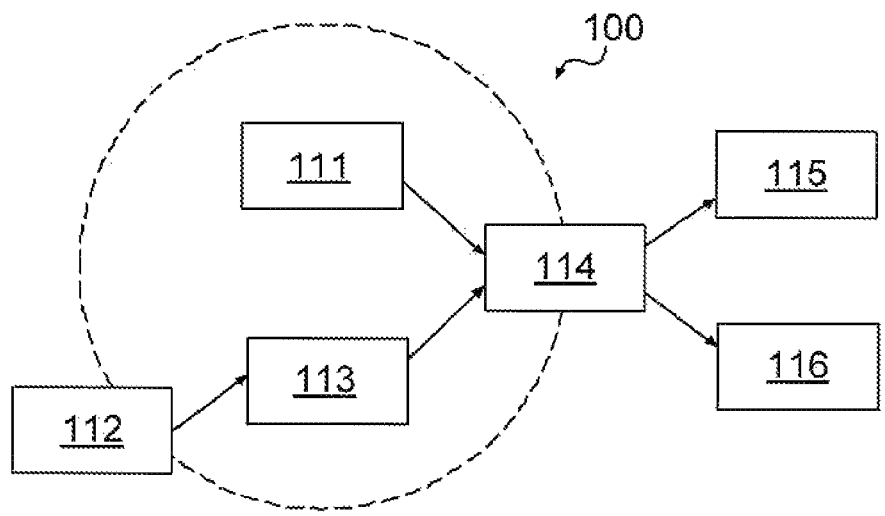
FIG. 1 is a diagram of an ad-hoc wireless network environment.

FIG. 1 is a diagram of an ad-hoc wireless network environment 100, in which multiple wireless communication devices (WCDs) 111, 112, 113, 114, 115, 116 are able to establish communication links. For a given WCD, such as WCD 114, the ability to establish a direct communication link depends on signal characteristics and distance from other ones of the WCDs 111-113, 115-116. It is also possible that a wireless communication link may be indirect, as is the case of WCD 112, communicating through WCD 113 to WCD 114, and ultimately with WCDs 115-116 through WCDs 113-114.

Hereafter, a wireless communication device (WCD) includes but is not limited to a user equipment, mobile station, fixed or mobile subscriber unit, pager, or any other type of device capable of operating in a wireless environment. When referred to hereafter, a base station (BS) includes but is not limited to a Node B, base station controller (BSC), site controller, access point or any other type of interfacing device in a wireless environment. An "access point" (AP) is a station or device which provides a wireless access for devices to establish a wireless connection with a LAN, and establishes a part of a wireless LAN (WLAN). If the AP is a fixed device on a WLAN, the AP is a station which transmits and receives data. The AP permits connection of a WTRU to a network, provided that the WLAN itself has a connection to the network.

In an ad-hoc network, communication requests are typically received on a first come first served basis, so that, for any communication device, if the communication request from a first external device uses the full capacity of communication bandwidth available for external communications, communication with further devices can be precluded or at least limited. In many cases, the communication bandwidth is constrained, but nevertheless, the network is what is known as a "greedy" system. This of course limits the capacity of an ad-hoc network to accept multiple, communication devices. In the case of a communication link; requiring only a limited baud rate, the establishment of "greedy" communication links is also inefficient in that it limits the total communication throughput available to a given communication device.

Operation

A given application may require a target SNR (signal to noise ratio) per symbol carrier-to-noise (C/N), given a modulation scheme, if the application is intended to achieve the required bit error rate (BER). The spectral density of the signal (wave), when multiplied by an appropriate factor, will give the power carried by the wave, per unit frequency. There are strict regulatory requirements imposed by regulatory agencies such as the Federal Communications Commission (FCC) and International Telecommunications Union (ITU) on the maximum power spectral density (PSD) that can be radiated to adjacent satellites. Since ultra wide bandwidth (UWB) is a PSD limited system, the fixed target C/N, will be achieved by varying the processing gain depending on the distance (within a limited range). Thus a larger distance implies a greater path loss and hence a larger required processing gain to attain the require C/N. This in turn will imply a lower supported data rate.

A communication link includes a basic physical layer. The physical layer and the MAC layer interact strongly through parameters such as the ambient interference (AM), the interference noise (IN) and minimum transmission rate ($R_{min}$). With respect to link inefficiency, most of the current RF technologies rely on a MAC layer to provide shared access to the media. Current MAC layers are designed to handle a single point-to-point link; that is, one mobile user/terminal device in communication with one base transmitting station (BTS) RF link. Hence, it is desirable to provide a wireless network with dynamically changing topology that is capable of handling incremental use of bandwidth so that the MAC layer may sense the media before transmission, which means that the best link is utilized.

The design of the MAC layer includes design considerations that address a UWB physical layer, mobile ad-hoc networks (MANETS), routing protocol, and the dynamic nature of the network.

A UWB physical layer is essentially a spread spectrum system and so has the advantage that it can handle interference better than narrow/wide, band-systems. Theoretical studies on MAC design for UWB ad-hoc networks have shown that a Code Division Multiple Access (CDMA)-like MAC with many links operating simultaneously is the optimal MAC. The models assumed in these works is simplistic but provides the intuition that a UWB system should allow many parallel links and handle the interference rather than allot them separate resources. Thus a UWB ad-hoc network requires scheduling rather than a pure graph based exclusion scheme. The studies also note that some exclusion of the closest interferers is required. This is because with large but limited bandwidth, the spread spectrum nature may not be sufficient to handle very close interferers, for example an interferer who is as close to me receiver as the transmitter. A UWB system is a PSD limited system and the theoretical based simulations note that power control is of little value since power is a limited resource whereas interference handling is preferable. Thus, links are often configured to operate at maximum available power and utilize some interference handling capability. In configuring the system, it is also assumed that the resource to be scheduled is time slots and not bandwidth. This is both for simplicity and due to the limited bandwidth flexibility in existing standards (minimum 500 MHz). The MAC design is suitable for implementation of various details of a practical UWB system based on the 802.15.3a standard.

Mobile ad-hoc networks (MANETS) are subject to QoS issues which are addressed by the MAC. MAC layer design for ad-hoc networks is a well researched problem. In MANETS, lack of QoS can be caused by either high bit error rate (BER) on wireless links, by low signal to noise and interference ratio (SINR), the congestion of uneven distribution of traffic flows, as well as by other factors. The key characteristic is that an ad-hoc network requires a distributed resource allocation scheme that may be converted into a distributed protocol. Also the lack of a central coordinator (i.e., the distributed requirement) implies that any resource allocation is very expensive in terms of protocol overhead. Certain well-documented issues with existing protocols such as the hidden terminal or exposed node problem in carrier sense multiple access/collision avoidance (CSMA/CA) may also be avoided.

The routing protocol at the network layer interacts closely with the MAC. Implementing a desired QoS is an issue to be handled at both layers and design of the MAC protocol may consider its interaction with the routing protocol. This issue may be handled at the admission control phase.

Ad hoc networks are also dynamic, in nature and new links are being formed (due to new sessions) while other links may drop out of the network. The dynamic nature of links may also be caused by the mobility of nodes or channel characteristic such as fading. This dynamic nature results in a choice for resource allocation. In global resource allocation (GRA) schemes, each time a new link is formed or terminated, the resources of all (including ongoing) links are renegotiated. In incremental resource allocation (IRA) schemes, resources are allocated only once at the start of a session. Thus, in IRA schemes, the network allocates resources to new links, while preserving the resources allocated to existing links. Evidently global schemes could achieve higher capacity (more admitted users) than incremental schemes. The primary consideration of robustness of active links, as well as the involved protocol overhead in resource allocation results in the choice of an incremental resource allocation scheme. Fading and mobility will be handled to a limited degree using the physical layer link budget. By way of example, the link budget may be achieved as through the link margin (LM). These will still affect the performance of the MAC.

The MAC is able to ensure that the data rate and delay requirements of the voice traffic are met in order to provide good QoS. Secondly based on the UWB physical layer it could be a CDMA based MAC, with limited exclusion. Finally the dynamic ad-hoc nature of the network presents an advantage for the MAC to be an incremental and distributed scheme which allocates resources to new links while protecting existing links.

In order to accomplish maximum number of simultaneously operating links in the wireless channel each source or forwarding device sends the remote control/ready to run (RC/RTR) message at the maximum power and based on the received power adjust the power in order to enable more spatial reuse. Received power can be expressed as $P_{RX}$ ($=P_{TX}*d^{-n}$), where n is the path loss constant. If the received power is $P_{RX}(=P_{TX}*d^{-n})$ then using the signal-to-noise-plus-interference rates (SINR) curves, it calculates the optimal SINR using the above equation to get the best possible power for a particular modulation scheme.

An approach for using an interference margin and power scheduling for a CDMA system is Implemented in accordance with the protocol. Since the physical layer is UWB, using CDMA to handle interference is advantageous. The physical layer could be a pulse based direct-sequence spread spectrum (DSSS) system and this is amenable to CDMA implementations. The use of random long PN codes is simple to implement and is expected to provide sufficiently low cross correlation that results in a reduction of interference power from distant interferers.

An additional margin, ambient interference (AIM) is added into the link budget. The additional margin in the form of AIM, is provided in order to accommodate the remaining interference power after the CDMA effect. This CDMA scheme combined with AIM will handle the interference form outside the interference range IR. The options for implementing CDMA will be noted in the protocol section. AIM has currently been fixed to a value and this may be revised on the basis of a detailed code characteristic based calculation.

Example options for code assignment include:

Use random long pseudo noise (PN) codes: in this case, there is no need for any code assignment protocol, the transmitter or the receiver of each hop will pick randomly a code and use it for that sessions. Codes are different for different hops of the same session, and also for same hop for different sessions.

Use codes that are specifically designed to have low-cross correlation properties in asynchronous environment such as Gold or Bent codes. Code assignment for an ad-hoc network to minimize interference leads back to the scheduling problem. Also it does not utilize the UWB nature of the physical layer. The UWB nature makes this spread spectrum system tolerant of interference and the MAC was hence designed to have local exclusion and let the spread spectrum nature handle distant interference.

The protocol uses the random long PN code. The random long PN code will be easy to implement over the direct sequence ultra wide band (DS-UWB) physical layer.

In order to achieve a desired robustness of links, an interference margin (M) is established. The interference margin (M) provides a desired robustness of each operating link. As noted the requirement for robustness of existing links while attempting to admit new links needs to be satisfied. Thus the interest is in not rescheduling the resources (power, time durations) of active links when a new link enters the system. At one extreme, a policy could be adopted which allows new links only if they cause very low interference (below some minimal value, i.e. are well separated) to existing links or can be scheduled in a separate time slot. This would result in significant loss since it allows no flexibility. For example, if link (i,j) is active and operating at the highest rate it can, a close link (n,m) will not be admitted since link (i,j) cannot tolerate any multiple access interference (MAI) (violation of QoS). Specifically for the UWB physical layer where the spread spectrum nature might result in a large resource gain with the simultaneous operating of links.

As noted earlier, vicinity is determined by the range of the RC. For new links that arrive within the vicinity of other links, either explicit scheduling or some over provisioning needed. A combination of scheduling and over-provisioning is provided that may be used by the admission control policy. Time slotting provides the scheduling mechanism. Over provisioning so that it may continue to operate without violating its QoS when new links enter the system that cannot be scheduled in a separate slot is also provided. A direct way to achieve this over provisioning is to schedule each link with an interference margin M, decibels (dB) with respect: to additive white Gaussian noise (AWGN). The value of M determines the sustainable MAI due to new links in the vicinity and time slot. This value M will be notified to the vicinity of the node through the RC packet. Thus during the reservation request procedure, the admission control check will determine the transmission duration of a link on the basis of the rate $R_{base}$. Here $R_{base}$ is the rate that can be achieved in the presence of interference power of value M dB. This overprovisioning results in a longer than required duration being reserved for a link. Let $R_{max}$ be the rate corresponding to there being none of the M dB of interference. Let $$k = \left\lfloor \frac{R_{max}}{R_{base}} \right\rfloor$$

be the integer valued ratio. It may be considered as the ratio of over provisioning (the link reserves a slot k times larger than required). The rate $R_{max}$ may be determined by the physical layer design. Following this for a certain k, $R_{base}$ and hence M can be determined. The parameter k is used as the parameter of choice due to the considerations of the resource recovery scheme detailed below. Note that providing this interference margin M also provides an additional protection against ambient interference and interfering RC packets (in the absence of a nearby interferer). The margin M is chosen on the basis of the parameter k and hence allows links with a higher rate $R_{max}$ (operating at a higher $SNR_T$, shorter distance) to have a lower margin M (based on the physical layer model). Intuitively this implies that a link operating with a high $SNR_T$ can tolerate very little interference (very few interferers in its vicinity) and may therefore be scheduled in its own slot—a result that matches the theoretical expectation. This dynamic adaptation to the topology of each operating link clearly incorporates the physical layer into the MAC design. In the current ranges of rates the Interference margin is constant to within a small error and so it can be fixed as a parameter. Certain typical values of M, and the interference handling capability they present will be noted to the protocol section. This interference margin will determine the rate $R_{RC}$ at which the control packets need to be sent so that, potential interferers will be aware of the scheduled transmissions. This is calculated in the protocol section.

Hybrid automatic repeat request (HARQ) protocols are used to reserve time slots. Utilizing an interference margin is a mechanism that provides some flexibility against the arrival of new links. It is a result in over provisioning of time that is not utilized in the absence of interference and is a wasted resource. A physical layer mechanism to adapt to the present interference is coding. Here the simplest version of coding is utilized, i.e., repetition coding in its protocol form—Hybrid ARQ. A link reserves a time slot of duration corresponding to $R_{base}$. However in the absence of interference it requires a duration corresponding to $R_{max}$, which is k times less. So as to be adaptable to the presence of interference of power up to M dB, the transmitter will attempt to transmit at $R_{max}$ (i.e., the processing gain corresponding to $R_{max}$). In the absence of interference, the transmission is successful and this is noted by the receiver by transmitting a small acknowledgement (ACK) packet. In the presence of some interference the packet will not be decode successfully and this may be determined by a simple check sum or cyclic redundancy check (CRC) code. Then the receiver transmits a negative ACK and the transmitter retransmits the same message (ARQ) again. This process is repeated up to k times. In the absence of other channel impairments this method will ensure the successful reception of the packet within its scheduled time slot corresponding to $R_{base}$. It also provides a recovery of slots in the absence of interference since the transmission will use the minimum number of transmissions at rate $R_{max}$ required for successful reception. This Hybrid ARQ scheme provides a coarse form, of rate adaptation to the level of interference as well as a method to utilize the recovered time. The recovered time may be used for other traffic or control information as noted in the protocol section. This Hybrid ARQ scheme thus provides some adaptation to local interference and also to ambient interference beyond the extent of AIM. The performance gain due to this scheme is difficult to judge analytically due to the random variation of interference and so will be noted in simulations. Also this scheme is a simple scheme and may be revised to a more sophisticated incremental forward error correction (FEC) scheme that also provides a more fine tuned rate adaptation against the noise.

Power scheduling is performed in order to facilitate admission control. In a power spectral density (PSD) limited case such as UWB, it is believed that an optimal schedule consists of links operating at their PSD limit and altering some other resource such as time or bandwidth or coding to handle interference. Intuitively this is because in a UWB system, power is a scarce resource while interference may be handled by the spread spectrum nature. In keeping with this intuition, no power allocation is performed. However the broadcasting of transmission power will still be retained to allow for future revisions as well as to allow the admission control algorithm to use this as an option.

Figure 2:
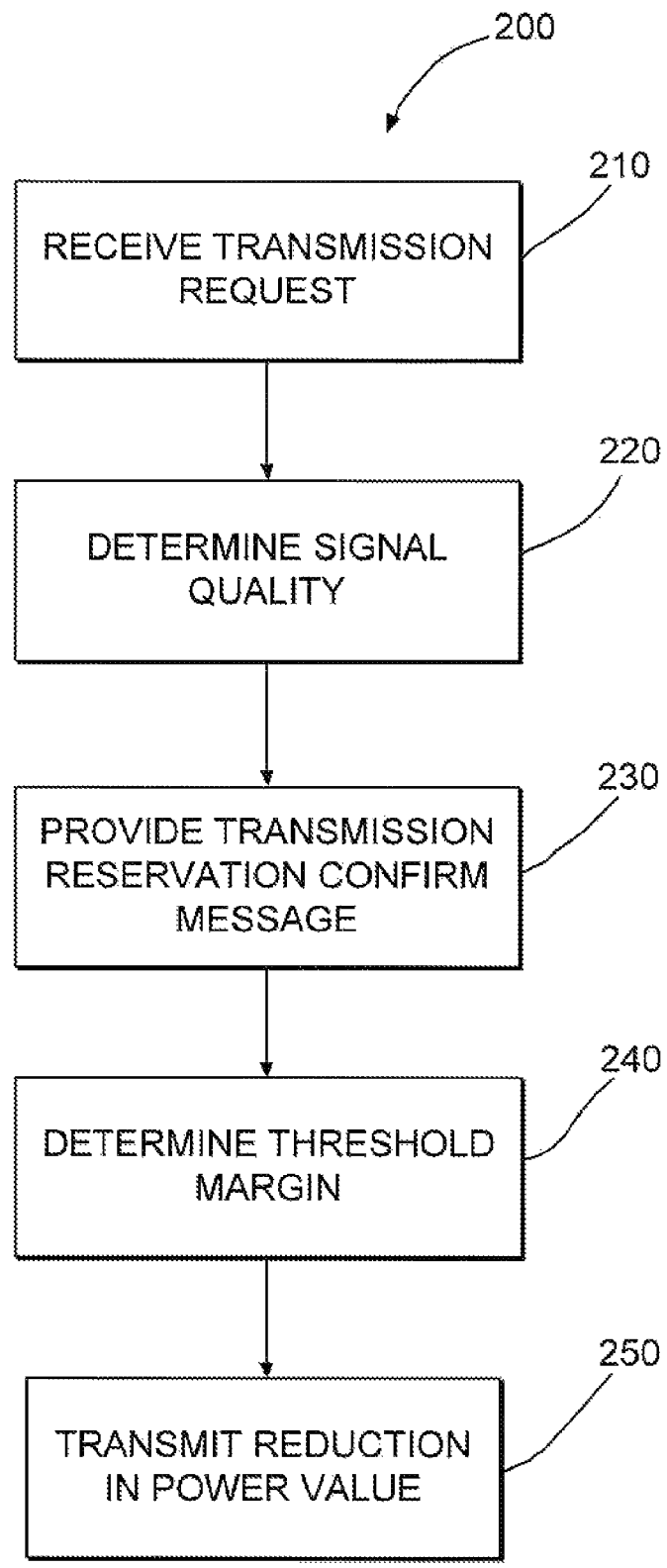
FIG. 2 is a flow chart showing an example method corresponding to the operation of receiving and transmitting.

FIG. 2 is a flow chart showing an example method 200 corresponding to the operation performed by device 200. Method 200 includes receiving (step 210) a transmission request from a wireless communication device (WCD), determining (step 220) a signal quality, providing (step 230) as a response, a transmission reservation confirmation message, determining (step 240) a threshold margin of the signal quality value at the data rate, and transmitting (step 250) a reduction in power value.

The method may further include receiving further communication requests from other WCDs. If the acceptance of the communication request from the other WCDs results in the signal quality value of the first WCD falling below the threshold value, the communication request from the other WCDs will be refused. If the acceptance of the communication request from the other WCDs results in the signal quality value of the first WCD remaining within the threshold value, the communication request from the other WCDs will be accepted.

Accepting the communication request from the WCD may include one of the following for the modulation scheme being used to obtain a best power value: 1) using a signal to undesired signal ratio value where the undesired signal is interference or noise; or 2) using a signal to interference and noise ratio (SINR); or 3) using a signal to interference ratio (SIR); or 4) using a signal to noise ratio (SNR).

The WCD transmits at a predetermined power which may be adjusted based on the received power in accordance with the signal quality ratio. The adjustment provides an increase in spatial reuse.

When the signal to undesired signal ratio is used as the signal quality value, and the signal quality value falls below a threshold, then the data rate is reduced if available. If the data rate is unavailable, the signal is dropped. If the signal quality value exceeds a predetermined higher threshold, then a predetermined higher data rate is established. The power of the WCD is also adjusted as determined by the power received. The adjustment is made is accordance with the signal quality value which provides an increase in spatial reuse.

The method may further include adjusting the power of the WCD in order to obtain a target data rate and a received power.

Functional Operation

Figure 3:
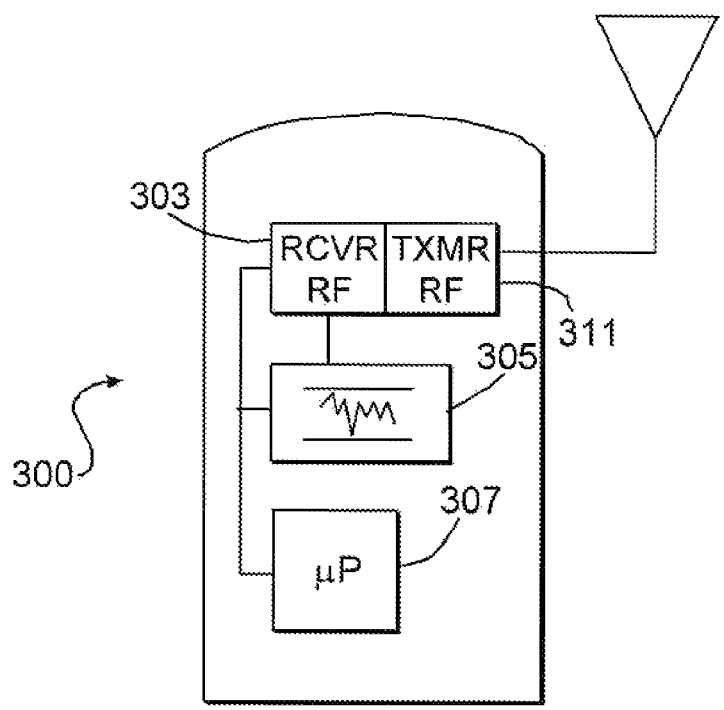
FIG. 3 is a schematic block diagram of a wireless communication device (WCD) implementing the resource management techniques.

FIG. 3 is a schematic block diagram of a WCD 300 implementing the resource management techniques, in which the WCD 300 provides resource management for increased spatial reuse in an ad-hoc wireless communication system. The WCD 300 includes a receiver 303, a signal processor 305 and a control processor 307. The receiver is able to receive a transmission allocation request messages, which include request to reserve messages from external WCDs. The signal processor 305 includes a signal quality determining circuit, used to determine a signal quality value based on the received transmission allocation request message. The control processor 307 and signal processor 305 provide a transmission allocation response, which includes a data rate, based on a threshold margin determined by the processors 305, 307 of the signal value at the data rate. A transmitter 311 functions as an output circuit in communication with said signal processor and responsive to signal quality determination circuit, transmits a reduction in power value for adjusting the power of external WCDs. The reduction in power value is based on a received power in accordance with the signal quality value and the threshold margin. A transmitter 317 provides signal outputs for communication by WCD, including communication of the power values and rates.

The WCD 300 also includes a transmission reservation confirm/request to reserve circuit, implemented as a function of the processors 305, 307. The reservation confirm/request to reserve functions by receiving the transmission allocation request message and providing the transmission allocation response. When the WCD 300 receives a request to reserve message from external WCDs, the processors 305, 307 provides the transmission allocation response as a reservation confirm signal.

Figure 4:
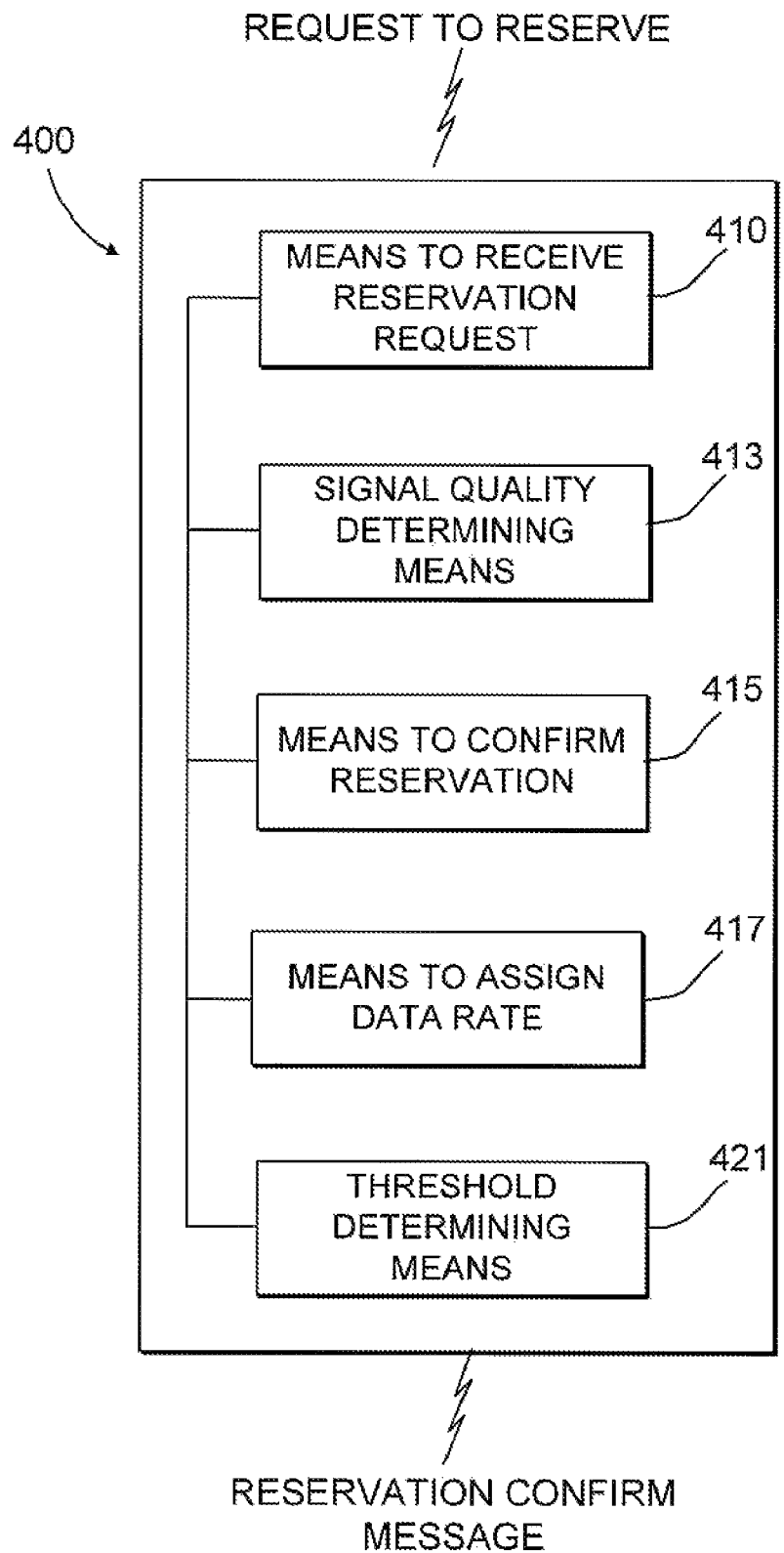
FIG. 4 is a diagram showing the functional operation of the invention.

FIG. 4 is a diagram showing the functional operation of the invention. The implementation of the technique is accomplished by a receiver 400, including reservation request receiving means 410 for receiving a request to reserve message from a first external wireless communication device. The reservation request means can be provided by receiver 303 (FIG. 3), and processors 305, 307 (FIG. 3). Signal quality determining means 413 are used to render a signal quality value based on the received request to reserve message. Means 415 to provide a transmission reservation confirm message, and means 417 to provide an assigned data rate generate the response, which may be part of a reservation confirm message. Processors 305, 307 (FIG. 3) provide signal quality determining means and determine a signal quality value, and also provide response means to provide a transmission reservation confirm message. Threshold determining means 421 determine a threshold margin of the signal value at the data rate and providing a reduction in power value for adjusting the power of external WCDs based on received power in accordance with the signal quality value. Processors 305, 307 (FIG. 3) provide threshold determination means for determining.

Digital Implementation

A machine readable medium may be provided having instructions, for establishing a communication link and assigning communication parameters with external WCDs. A machine-readable medium includes any mechanism that provides (i.e., stores and/or transmits information in a form readable by a machine (e.g., a computer). For example, a machine-readable medium includes, but is not limited to, read only memory (ROM); random access memory (RAM); magnetic disk storage media; optical storage media; flash memory devices; electrical, optical, acoustical or other form of propagated signals (e.g., carrier waves, infrared signals, digital signals, etc.); storage media; radio channels; and wireless channels and various other mediums capable of storing, containing, or carrying instructions and/or data.

CONCLUSION

The teachings provided herein of the invention can be applied to other communication systems, not necessarily the exemplary communication system described above. For example, while the present invention has been generally described above as being employed in the CDMA communication system, the present invention is equally applicable to other digital or analog cellular communication systems.

These and other changes can be made to the invention in light of the above detailed description. In general, in the following claims, the terms used should not be construed to limit the invention to the specific embodiments disclosed in the specification and the claims. Accordingly, the invention is not limited by the disclosure, but instead its scope is to be determined entirely by the following claims. The techniques and modules described herein may be implemented by various means. For example, these techniques may be implemented in hardware, software, or a combination thereof. For a hardware implementation, the processing units within an access point or an access terminal may be implemented within one or more application specific integrated circuits (ASICs), digital signal processors (DSPs); digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors or demodulators. The memory unit may be implemented within the processor or external to the processor, in which case it can be communicatively coupled to the processor via various means.

The previous description of the disclosed embodiments is provided to enable any person skilled in the art to make or use the features, functions, operations, and embodiments disclosed herein. Various modifications to these embodiments may be readily apparent to those skilled in the art, and the generic principles defined herein may be applied to other embodiments without departing from their spirit or scope. Thus, the present disclosure is not intended to be limited to the embodiments shown herein but is to be accorded the widest scope consistent with the principles and novel features disclosed herein.

The invention claimed is:

1. In an ad-hoc wireless communication system, a method for resource management, comprising:
    receiving a request to reserve message from a first wireless communication device (WCD);
    determining a signal quality value based on the received request to reserve message;
    providing, as a response to the received request to reserve message, a transmission reservation confirm message that includes an assigned data rate;
    determining a threshold margin of the signal quality value at the data rate;
    transmitting a reduction in power value for adjusting the power of the first wireless communication device based on a received power in accordance with the signal quality value and the threshold margin, wherein the adjustment provides an increase in spatial reuse of signal spectrum;
    receiving a communication request from a further wireless communication device; and
    in the case that an acceptance of the communication request from the further wireless communication device will result in the signal quality value of the first wireless communication device falling below said threshold margin, refusing the communication request from the further wireless communication device, and in the case that the acceptance of the communication request from the further wireless communication device will result in the signal quality value of the first wireless communication device remaining within said threshold margin, accepting the communication request from the further wireless communication device.

2. The method of claim 1, further comprising using a signal to undesired signal ratio value to obtain a best power value for the modulation scheme in use, wherein the undesired signal comprises at least one of interference or noise, and wherein the signal to undesired signal ratio value provides the signal quality value for acceptance or rejection of the communication request from the further external wireless communication device.

3. The method of claim 1, further comprising using a signal to interference and noise ratio (SINR) to obtain a best power value for the modulation scheme in use, wherein the SINR provides the signal quality value for acceptance or rejection of the communication request from the further external wireless communication device.

4. The method of claim 1, further comprising using a signal to interference ratio (SIR) to obtain a best power value for the modulation scheme in use, wherein the SIR provides the signal quality value for acceptance or rejection of the communication request from the further external wireless communication device.

5. The method of claim 1, further comprising using a signal to noise ratio (SNR) value to obtain a best power value for the modulation scheme in use, wherein the SNR provides the signal quality value for acceptance or rejection of the communication request from the further external wireless communication device.

6. The method of claim 1, further comprising:
receiving a second request to reserve message from a second wireless communication device transmitting at a predetermined power; and
adjusting the power of the second wireless communication device based on a received power in accordance with a signal quality ratio, based on the received second request to reserve message, wherein the adjustment provides an increase in spatial reuse.

7. The method of claim 1, further comprising:
receiving a second request to reserve message from a second wireless communication device transmitting at a predetermined power;
determining a second signal quality value based on the received second request to reserve message;
using a signal to undesired signal ratio as the second signal quality value;
if the second signal quality value falls below a signal quality threshold reducing the data rate of the second wireless communication device in the case of availability of a reduced data rate;
if the second signal quality value falls below the signal quality threshold and in the event of unavailability of a reduced data rate, dropping the signal;
if the signal quality value exceeds a predetermined higher threshold, increasing the data rate of the second wireless communication device; and
adjusting the power of the second wireless communication device as determined by a received power, the adjustment made in accordance with the second signal quality value, wherein the adjustment provides an increase in spatial reuse of the signal spectrum.

8. The method of claim 1, further comprising adjusting the power of the first wireless communication device in order to obtain a target data rate and a target received power.

9. A wireless communication device for providing resource management for increased spatial reuse in an ad-hoc wireless communication system, the wireless communication device comprising:
a receiver for receiving a transmission allocation request message from an external wireless communication device;
a signal quality determining circuit communicatively coupled with said receiver, said signal quality determining circuit configured for determining a signal quality value based on the received transmission allocation request message, providing a transmission allocation response, the transmission allocation response providing a data rate, and determining a threshold margin of the signal quality value at the data rate;
a transmitter communicatively coupled with said signal quality determining circuit, said transmitter configured for transmitting a reduction in power value for adjusting the power of the external wireless communication device based on a received power in accordance with the signal quality value and the threshold margin, wherein the adjustment provides an increase in spatial reuse of signal spectrum; and
a reservation confirmation circuit, wherein:
the receiver has a capability of receiving a communication request from a further wireless communication device;
upon receipt of a communication request from the further wireless communication device, the signal quality determining circuit is configured to respond to the received communication request from the further wireless communication device by determining a signal quality of the communication request from the further wireless communication device and determining if an acceptance of the communication request from the further wireless communication device will result in the signal quality value of the external wireless communication device falling below said threshold margin; and
in the case in which the acceptance of the communication request from the further wireless communication device will result in the signal quality value of the external wireless communication device falling below said threshold margin, the reservation confirmation circuit is configured to reject the communication request from the further wireless communication device, and in the case in which the acceptance of the communication request from the further wireless communication device will result in the signal quality value of the external wireless communication device remaining within said threshold margin, the reservation confirmation circuit is configured to accept the communication request from the further wireless communication device.

10. The wireless communication device of claim 9, further comprising a transmission reservation confirm/request to reserve circuit for receiving the transmission allocation request message and providing the transmission allocation response, wherein
the transmission reservation confirm/request to reserve circuit is configured to receive a request to reserve message from the external wireless communication device, and the transmission reservation confirm/request to reserve circuit is configured to provide the transmission allocation response as a reservation confirm signal.

11. The wireless communication device of claim 9, wherein:
the transmission allocation request message takes the form of a request to reserve message; and the transmission allocation response takes the form of a reservation confirm message.

12. A wireless communication device for providing resource management for increased spatial reuse in an ad-hoc wireless communication system, the wireless communication device comprising:
a receiver for receiving a transmission allocation request message from an external wireless communication device;
a signal quality determining circuit communicatively coupled with said receiver, said signal quality determining circuit configured for determining a signal quality value based on the received transmission allocation request message, providing a transmission allocation response, the transmission allocation response providing a data rate, and determining a threshold margin of the signal quality value at the data rate;
a transmitter communicatively coupled with said signal quality determining circuit, said transmitter configured for transmitting a reduction in power value for adjusting the power of the external wireless communication device based on a received power in accordance with the signal quality value and the threshold margin, wherein the adjustment provides an increase in spatial reuse of signal spectrum; and a reservation confirmation circuit, wherein:
the receiver has a capability of receiving a communication request from a further wireless communication device;
upon receipt of a communication request from a further wireless communication device, the signal quality determining circuit responds to the received communication request from the further wireless communication device by determining a signal quality of the communication request from the further wireless communication device, the signal quality comprising one of a signal to interference and noise ratio (SINR), a signal to interference ratio (SIR), or a signal to noise ratio (SNR) value, to obtain a best power value for the modulation scheme in use;
in the case in which the that an acceptance of the communication request from the further wireless communication device will result in the signal quality value of the external wireless communication device falling below said threshold, the reservation confirmation circuit is configured to reject the communication request from the further wireless communication device, and in the case that the acceptance of the communication request from the further wireless communication device will result in the signal quality value of the external wireless communication device remaining within said threshold margin, the reservation confirmation circuit is configured to accept the communication request from the further wireless communication device; and
the signal quality determining circuit is configured to provide the signal quality value for the acceptance of the communication request from the further wireless communication device for acceptance or rejection of the communication request from the further wireless communication device.

13. A wireless communication device for providing resource management for increased spatial reuse in an ad-hoc wireless communication system, the wireless communication device comprising:
means for receiving a request to reserve message from a first external wireless communication device;
means for determining a signal quality value based on the received request to reserve message;
means for providing, as a response to the received request to reserve message, a transmission reservation confirm message that includes an assigned data rate;
means for determining a threshold margin of the signal quality value at the data rate;
means for transmitting a reduction in power value for adjusting the power of the first external wireless communication device based on a received power in accordance with the signal quality value and the threshold margin; and
means for transmitting the reduction in power value, wherein the adjustment provides an increase in spatial reuse of signal spectrum;
wherein in the case that an acceptance of a communication request from a further external wireless communication device will result in the signal quality value of the first external wireless communication device falling below said threshold margin, the wireless communication device is configured to refuse the communication request from the further external wireless communication device, and in the case that the acceptance of the communication request from the further external wireless communication device will result in the signal quality value of the first external wireless communication device remaining within said threshold margin, the wireless communication device is configured to accept the communication request from the further external wireless communication device.

14. The wireless communication device of claim 13, wherein the means for determining the threshold margin comprises means for using a signal to undesired signal ratio value to obtain a best power value for the modulation scheme in use, wherein the undesired signal comprises at least one of interference or noise, and wherein the signal to undesired signal ratio value provides the signal quality value for the acceptance of the communication request from the further external wireless communication device for acceptance or rejection of the communication request from the further external wireless communication device.

15. The wireless communication device of claim 13, wherein:
the means for determining the threshold margin comprises means for using a signal to undesired signal ratio value to obtain a best power value for the modulation scheme in use, wherein the undesired signal comprises at least one of interference or noise, and wherein the signal to undesired signal ratio value provides the signal quality value for acceptance or rejection of the communication request from the further external wireless communication device; and
wherein the means for transmitting the reduction in power value is configured to adjust the power of the first external wireless communication device based on a received power in accordance with the signal quality value, wherein the adjustment provides an increase in spatial reuse.

16. The wireless communication device of claim 13, wherein:
the means for determining the threshold margin comprises means for using a signal to undesired signal ratio value as the signal quality value to obtain a best power value for the modulation scheme in use, wherein the undesired signal comprises at least one of interference or noise;
the means for transmitting the reduction in power value is configured to adjust the data rate such that if the signal quality value falls below a first threshold, the data rate is reduced in the case of availability of a reduced data rate, and if the signal quality value exceeds a predetermined higher threshold, the data rate is increased; and in the case of the signal quality value falling below the first threshold, and in the event of unavailability of a reduced data rate, means for providing the transmission reservation confirm message is configured to drop the signal.

17. A non-transitory storage medium for use in monitoring the operation of a wireless communication device, the storage medium comprising processor-executable instructions, the instructions comprising:

instructions for receiving a request to reserve message from a first external wireless communication device;

instructions for determining a signal quality value based on the received request to reserve message;

instructions for providing, as a response to the received request to reserve message, a transmission reservation confirm message that includes an assigned data rate;

instructions for determining a threshold margin of the signal quality value at the data rate;

instructions for transmitting a reduction in power value for adjusting the power of the first external wireless communication device based on a received power in accordance with the signal quality value and the threshold margin, wherein the adjustment provides an increase in spatial reuse of signal spectrum;

instructions for receiving a communication request from a further external wireless communication device;

instructions for refusing the communication request from the further external wireless communication device if an acceptance of the communication request from the further external wireless communication device will result in the signal quality value of the first external wireless communication device falling below said threshold margin; and instructions for accepting the communication request from the further external wireless communication device if the acceptance of the communication request from the further external wireless communication device will result in the signal quality value of the first external wireless communication device remaining within said threshold margin.

* * * * *